(12) United States Patent
Fu

(10) Patent No.: US 11,584,422 B2
(45) Date of Patent: Feb. 21, 2023

(54) STROLLER WITH MULTIPLE STORAGE COMPARTMENTS

(71) Applicant: Wonderland Switzerland AG, Steinhausen (CH)

(72) Inventor: Xiuping Fu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/124,463

(22) Filed: Dec. 16, 2020

(65) Prior Publication Data

US 2021/0188339 A1 Jun. 24, 2021

(30) Foreign Application Priority Data

Dec. 18, 2019 (CN) .......................... 201922287763.X

(51) Int. Cl.
*B62B 9/12* (2006.01)
*B62B 9/26* (2006.01)

(52) U.S. Cl.
CPC . *B62B 9/12* (2013.01); *B62B 9/26* (2013.01)

(58) Field of Classification Search
CPC ............ B62B 9/26; B62B 9/12; B62B 3/1448
See application file for complete search history.

(56) References Cited

U.S. PATENT DOCUMENTS

| | | | | |
|---|---|---|---|---|
| 6,139,046 A * | 10/2000 | Aalund | ..................... | B62B 7/08 280/47.38 |
| 8,794,492 B2 * | 8/2014 | Ballou | ..................... | B60R 11/00 224/539 |
| 8,857,829 B2 * | 10/2014 | Cheng | ..................... | B62B 9/26 280/47.38 |
| 9,511,789 B2 * | 12/2016 | Cheng | ..................... | B62B 7/008 |
| 9,517,791 B1 * | 12/2016 | Hawk | ..................... | B62B 9/26 |
| 9,771,095 B2 * | 9/2017 | Laffan | ..................... | B62B 9/28 |
| 10,384,584 B2 * | 8/2019 | Wheeler | ..................... | B60N 3/103 |
| 2002/0093157 A1 * | 7/2002 | Turner | ..................... | B62B 7/08 280/47.25 |
| 2002/0179663 A1 * | 12/2002 | Moore | ..................... | B60R 7/02 224/539 |
| 2008/0258437 A1 * | 10/2008 | Ryan | ..................... | B62B 9/26 280/650 |
| 2012/0223496 A1 * | 9/2012 | Ohnishi | ..................... | B62B 9/104 280/79.2 |
| 2022/0126905 A1 * | 4/2022 | Su | ..................... | B62B 9/12 |

FOREIGN PATENT DOCUMENTS

| | | | | |
|---|---|---|---|---|
| CN | 202608853 U | * | 12/2012 | ............ B62B 9/26 |
| CN | 205022659 U | | 2/2016 | |
| CN | 109501847 A | | 3/2019 | |
| CN | 209208837 U | | 8/2019 | |
| CN | 215752594 U | * | 2/2022 | |
| KR | 20120115140 A | * | 10/2012 | |
| KR | 20160093868 A | * | 8/2016 | ............ B62B 3/027 |

* cited by examiner

*Primary Examiner* — Emma K Frick
(74) *Attorney, Agent, or Firm* — Winston Hsu

(57) ABSTRACT

A stroller includes a stroller frame including a connecting component, and a storage basket installed under the stroller frame. The storage basket includes at least one connecting piece connected to the connecting component so as to partition the storage basket into at least two storage chambers. The stroller has multiple storage compartments, and different types of objects can be placed in different storage chambers, so as to improve sanitation and convenience of use.

6 Claims, 4 Drawing Sheets

STROLLER WITH MULTIPLE STORAGE COMPARTMENTS

BACKGROUND OF THE INVENTION

1. Field of the Invention

The present invention relates to a stroller, and more particularly, to a stroller with multiple storage compartments.

2. Description of the Prior Art

In existing strollers, in order to facilitate the carrying of supplies, there is generally a basket disposed under a seat. The basket can be used to store a baby's daily necessities, such as tissues, milk powder, diapers, etc., as well as food, such as fruit, vegetables, etc. When a caregiver takes the baby in the stroller to the market to buy food, meat and vegetables can be placed in the basket of the stroller. There is no need to carry additional shopping trolley, so it is very convenient to carry.

However, because the conventional stroller has only one basket, when the baby's daily necessities are placed together with raw meat and vegetables, it is easy to cause cross contamination, so that it is not hygienic to use. Besides, too many things put together will cause confusion and trouble in finding, so that it is inconvenient to use.

SUMMARY OF THE INVENTION

Therefore, an objective of the present invention is to provide a stroller with multiple storage compartments for solving the aforementioned problems.

In order to achieve the aforementioned objective, the present invention discloses a stroller with multiple storage compartments. The stroller includes a stroller frame including a connecting component, and a storage basket installed under the stroller frame. The storage basket includes at least one connecting piece connected to the connecting component so as to partition the storage basket into at least two storage chambers.

Preferably, the stroller frame includes two rear legs, and the connecting component is connected between the two rear legs, to support the storage basket and achieve stable connection of the two rear legs, so as to prevent sway of the stroller frame.

Preferably, the at least one connecting piece hangs on the connecting component.

Preferably, the at least one connecting piece is detachably connected to the connecting component.

Preferably, the stroller further includes a first connecting mechanism disposed on the at least one connecting piece for connecting different parts of the at least one connecting piece rolling around the connecting component. The connecting piece can be installed on or removed from the connecting component rapidly by the first connecting mechanism, so as to enhance convenience of assembly. After the connecting piece is removed from the connecting component, the multiple divided storage chambers can be integrated into a single large storage chamber to store a large object.

Preferably, the storage basket includes one connecting piece for partitioning the storage basket into two storage chambers.

Preferably, the stroller frame further includes a basket tube, and the storage basket is connected to the basket tube.

Preferably, the stroller further includes a second connecting mechanism for detachably connecting the storage basket to the basket tube. The storage basket can be installed on or removed from the basket tube rapidly by the second connecting mechanism, so as to enhance convenience of assembly.

Preferably, the basket tube is formed in a U shape, so that the storage basket can form the largest volume and have more support stability.

Preferably, the connecting component is a traverse rod.

In summary, the stroller frame includes the connecting component, and the storage basket includes the connecting piece connected to the connecting component, so as to partition the storage basket into the multiple divided storage chambers. Therefore, the baby's products can be placed in one of the storage chambers, and food, such as fruit, vegetables, etc., can be placed in another of the storage chambers, so as to separate them independently. It can avoid cross contamination and improve sanitation. Moreover, by separating different types of objects in different storage chambers, the objects can be quickly found, which improves the convenience of use.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
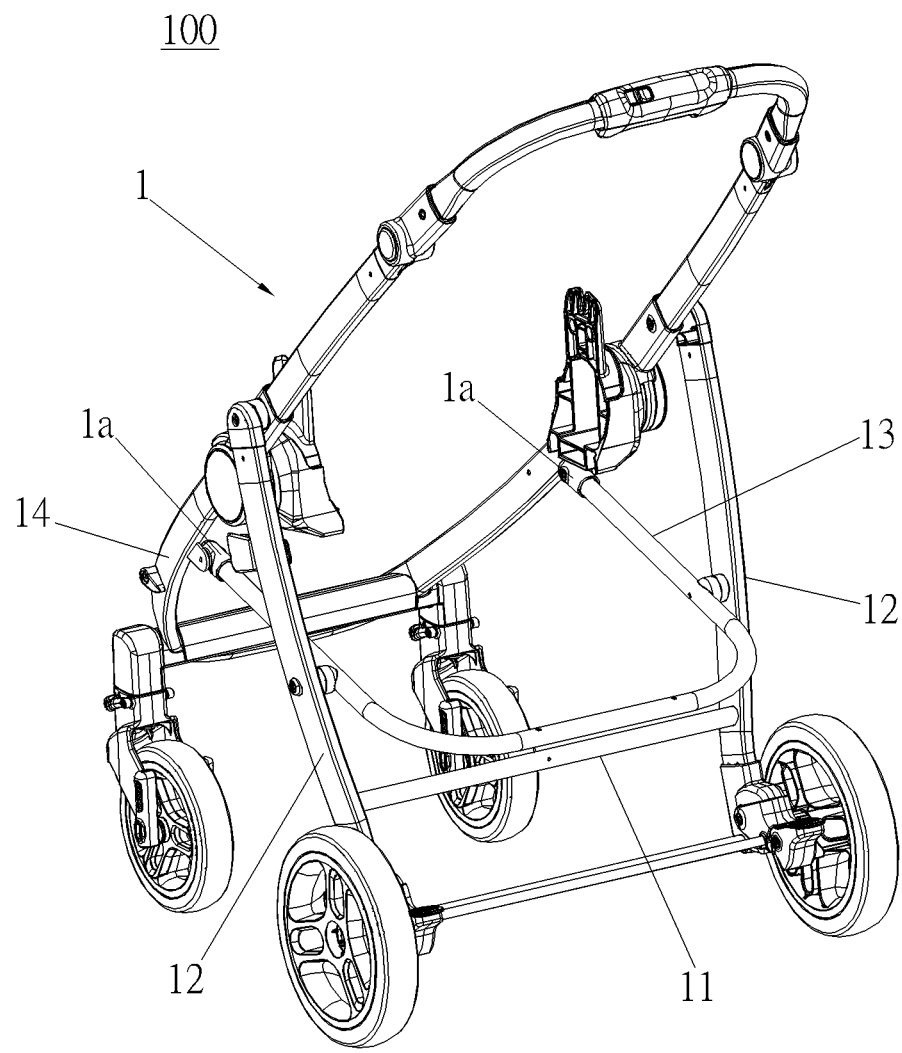
FIG. 1 is a diagram of a stroller frame of a stroller according to an embodiment of the present application.
Figure 2:
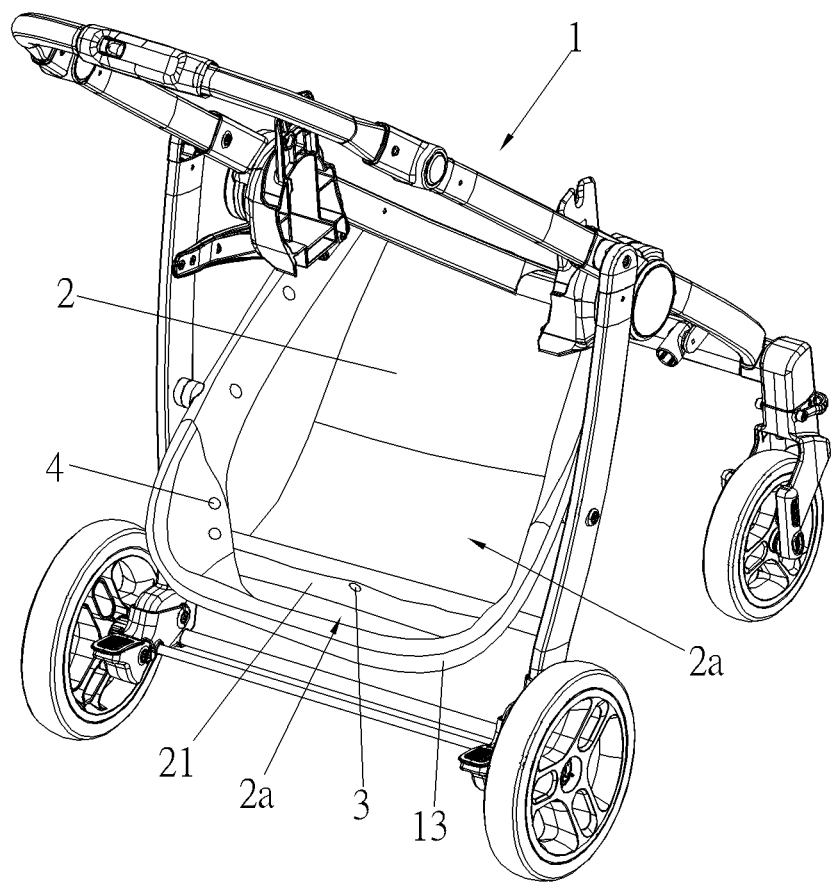
FIG. 2 is a diagram of the stroller according to the embodiment of the present application.
Figure 3:
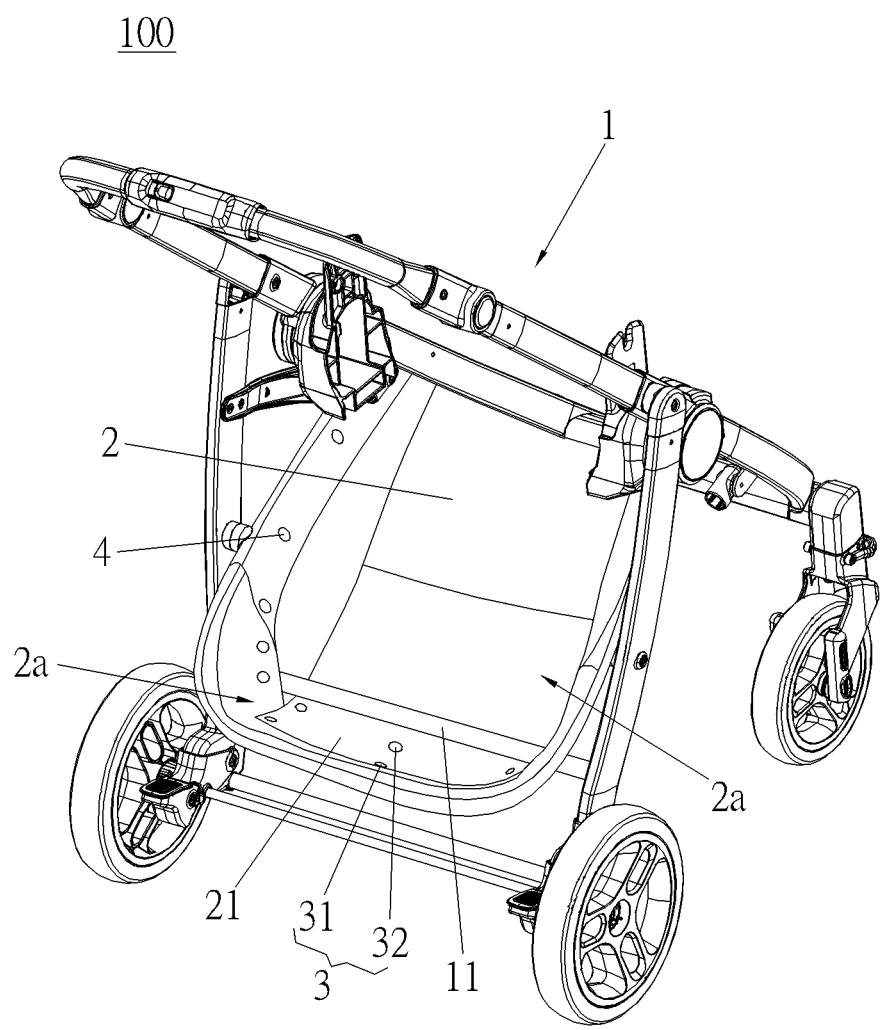
FIG. 3 is a diagram of an opened connecting piece of the stroller according to the embodiment of the present application.
Figure 4:
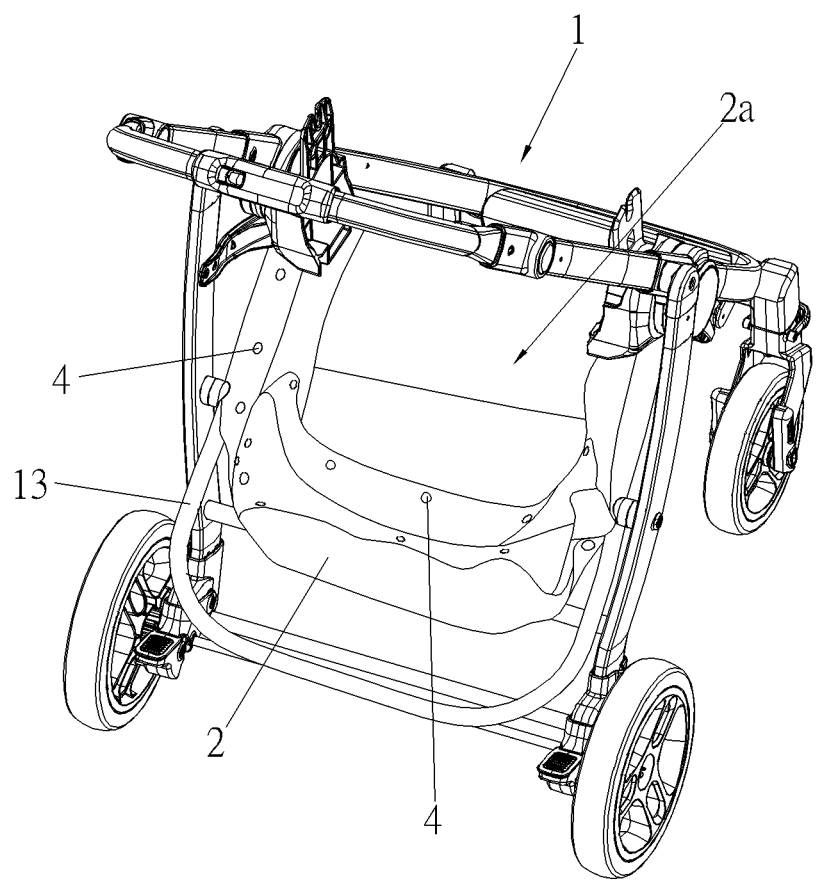
FIG. 4 is a diagram of the stroller at another view according to the embodiment of the present application.

Please refer to FIG. 1 to FIG. 4. FIG. 1 is a diagram of a stroller frame 1 of a stroller 100 according to an embodiment of the present application. FIG. 2 is a diagram of the stroller 100 according to the embodiment of the present application. FIG. 3 is a diagram of an opened connecting piece 21 of the stroller according to the embodiment of the present application. FIG. 4 is a diagram of the stroller 100 at another view according to the embodiment of the present application. The stroller 100 with multiple storage compartments of the present invention includes the stroller frame 1 and a storage basket 2. The storage basket 2 is installed under the stroller frame 1 and can be surrounded by seat cloth or mesh. The stroller frame 1 includes a connecting component 11, and the storage basket 2 includes at least one connecting piece 21 connected to the connecting component 11, so as to partition the storage basket 2 into at least two storage chambers 2a. For example, the storage basket 2 can include one connecting piece 21 extending along an axial direction of the connecting component 11, so as to partition the storage basket 2 into the two front and back storage chambers 2a. Alternatively, the stroller frame 1 also can include a plurality of connecting components 11, the storage basket 2 also can include a plurality of connecting pieces 21, and it depends on actual design demands.

As shown in FIG. 1, the connecting component 11 can be a traverse rod formed in a cylindrical shape. The stroller frame 1 includes two rear legs 12, and the connecting component 11 is connected between the two rear legs 12 of the stroller frame 1. This configuration can not only support the storage basket 2 but also achieve stable connection of the two rear legs 12 so as to prevent sway of the stroller frame 1.

As shown in FIG. 2 and FIG. 3, the connecting piece 21 can detachably hang on the connecting component 11. Specifically, the stroller 100 further includes a first connecting mechanism 3 disposed on the connecting piece 21 for connecting different parts of the connecting piece 21 rolling around the connecting component 11. The first connecting mechanism 3 can include a male buckle, a female buckle, a snap button, a zipper, a Velcro fastener, and so on. In this embodiment, the first connecting mechanism 3 includes at least one male snap button 31 disposed on an edge of the connecting piece 21, and at least one female snap button 32 disposed on the connecting piece 21 and spaced from the at least one male snap button 31 at an interval along a height direction of the connecting piece 21. When the connecting piece 21 winds around the connecting component 11 to align the male snap button 31 with the female snap button 32, the male snap button 31 can buckle with the female snap button 32. The connecting piece 21 can be installed on or removed from the connecting component 11 rapidly by the first connecting mechanism 3, so as to enhance convenience of assembly. After the connecting piece 21 is removed from the connecting component 11, the multiple divided storage chambers 2a can be integrated into a single larger storage chamber to store a large object.

As shown in FIG. 1 and FIG. 4, the stroller frame 1 further includes a basket tube 13, and the storage basket 2 is connected to the basket tube 13. Two sliding sleeves 1a are slidably sleeved on front ends of the basket tube 13 and rotatably disposed on a front leg 14 of the stroller frame 1. A middle portion of the basket tube 13 is pivoted to the rear legs 12 of the stroller frame 2, so that the basket tube 13 can be folded together with folding operation of the front leg 14 and the rear legs 12 of the stroller frame 1. The storage basket 2 is connected to the basket tube 13, and the basket tube 13 is formed in a U shape, so that the storage basket 2 can form the largest volume and have more support stability. Specifically, the stroller 100 further includes a second connecting mechanism 4 for detachably connecting the storage basket 2 to the basket tube 13. The second connecting mechanism 4 can include a male buckle, a female buckle, a snap button, a zipper, a Velcro fastener, and so on. The second connecting mechanism 4 can have similar structure as one of the first connecting mechanism 3. The storage basket 2 can be installed on or removed from the basket tube 13 rapidly by the second connecting mechanism 4, so as to enhance convenience of assembly.

In contrast to the prior art, the stroller frame 1 includes the connecting component 11, and the storage basket 2 includes the connecting piece 21 connected to the connecting component 11, so as to partition the storage basket 2 into the multiple divided storage chambers 2a. Therefore, the baby's products can be placed in one of the storage chambers 2a, and food, such as fruit, vegetables, etc., can be placed in another of the storage chambers 2a, so as to separate them independently. It can avoid cross contamination and improve sanitation. Moreover, by separating different types of objects in different storage chambers, the objects can be quickly found, which improves the convenience of use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
    a stroller frame comprising a connecting component; and
    a storage basket installed under the stroller frame, and the storage basket comprising a connecting piece formed in a sheet structure, and the connecting piece detachably hanging from the connecting component and extending along an axial direction of the connecting component, so as to partition the storage basket into two front and back storage chambers, and after the connecting piece is removed from the connecting component, the two front and back storage chambers being integrated into a single storage chamber larger than the two front and back storage chambers individually;
    wherein the connecting component is a transverse rod.

2. The stroller of claim 1, wherein the stroller frame comprises two rear legs, and the connecting component is connected between the two rear legs of the stroller frame.

3. The stroller of claim 1, further comprising a first connecting mechanism disposed on the connecting piece, and after the connecting piece is folded relative to the connecting component, the first connecting mechanism being for connecting parts of the folded connecting piece located at two opposite sides of the connecting component.

4. The stroller of claim 1, wherein the stroller frame further comprises a basket tube, and the storage basket is connected to the basket tube.

5. The stroller of claim 4, further comprising a second connecting mechanism for detachably connecting the storage basket to the basket tube.

6. The stroller of claim 4, wherein the basket tube is formed in a U shape.

* * * * *